Dec. 9, 1947.  C. S. DAYTON  2,432,291
DISHWASHING APPARATUS
Filed March 15, 1945  2 Sheets-Sheet 2

Inventor:
Carl S. Dayton,
by Harry E. Dunham
His Attorney.

Patented Dec. 9, 1947

2,432,291

UNITED STATES PATENT OFFICE 2,432,291

DISHWASHING APPARATUS

Carl S. Dayton, Bridgeport, Conn., assignor to General Electric Company, a corporation of New York Application March 15, 1945, Serial No. 582,836

6 Claims. (Cl. 134—114)

This invention relates to dishwashing apparatus, more particularly to such apparatus having a motor driven impeller for circulating cleansing liquid in the vat, and it has for its object the provision of apparatus of this character having an improved organization of impeller and motor.

In certain dishwashing apparatus heretofore known, there is provided a washing vat which has a motor driven impeller located in the lower portion of the vat for circulating cleansing liquid, such as hot water outwardly and upwardly in the vat to effect a cleansing action on dishes and other utensils placed in the vat. The motor is located underneath the bottom wall of the vat and is connected with the impeller by means of a shaft which passes through the bottom wall.

In accordance with this invention, the motor is placed within the vat in the lower portion thereof, and it is so related to the impeller that the combined impeller and motor assembly does not occupy any more space than did the impeller already occupy. The organization is not only smaller than those heretofore used but it is less expensive and can be very easily installed in the vat.

Figure 1:
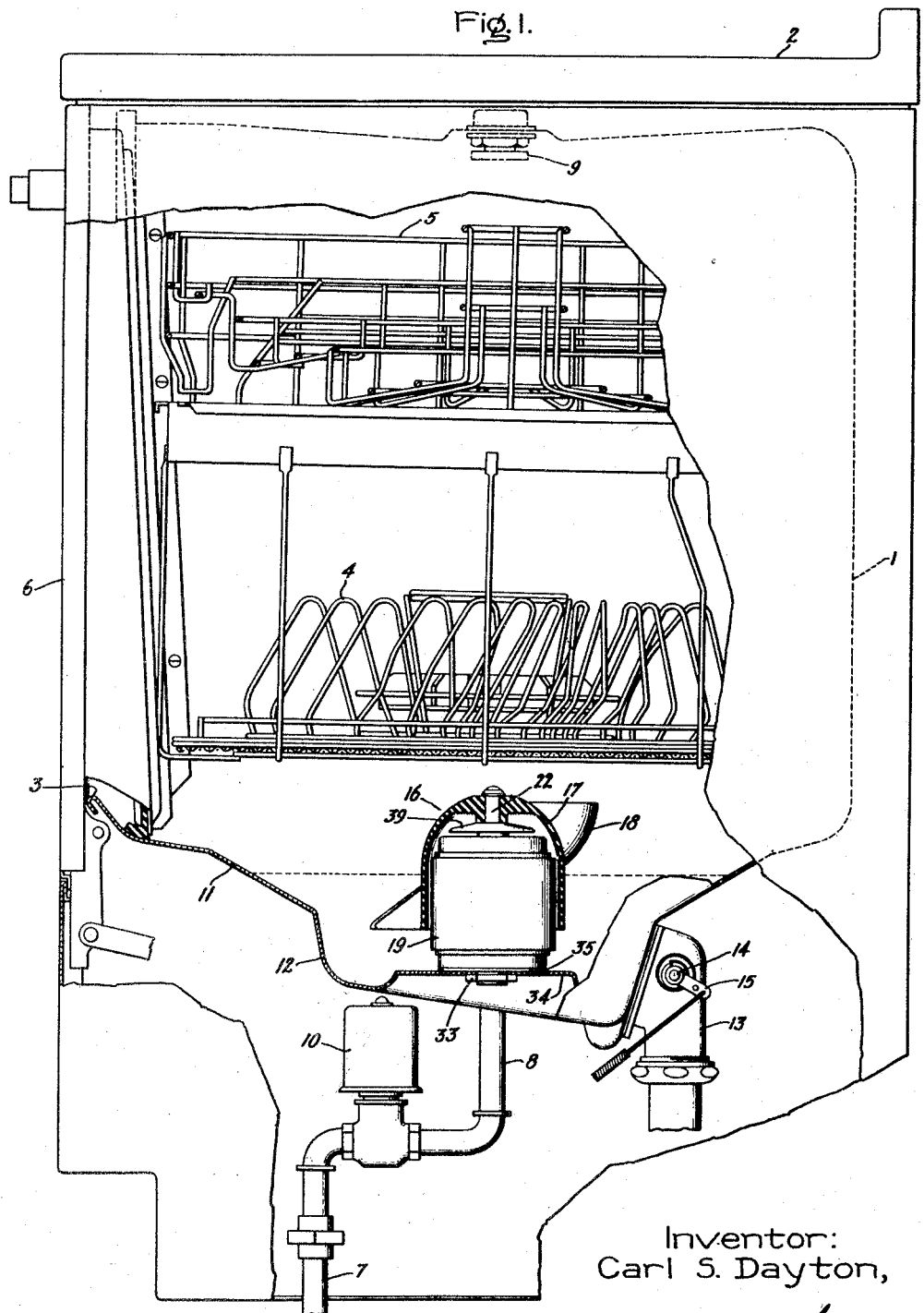
Figure 2:
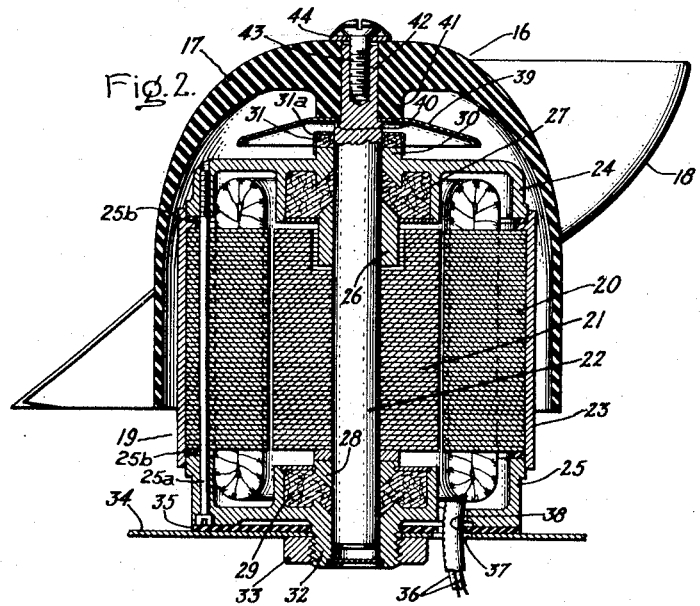
Figure 3:
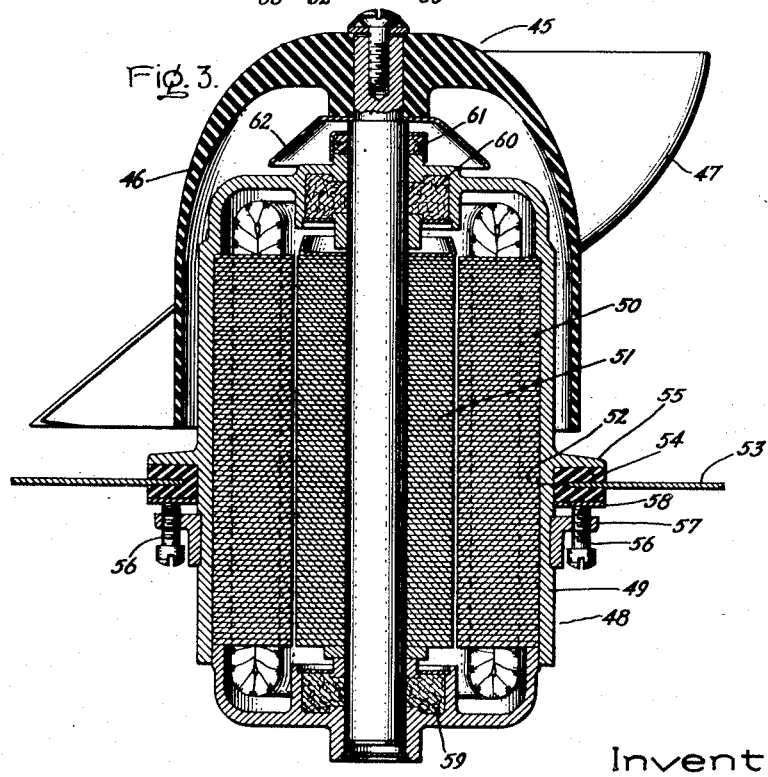

For a more complete understanding of this invention, reference should be had to the accompanying drawing in which Fig. 1 is a vertical elevation of dishwashing apparatus embodying this invention, parts being broken away so as to illustrate certain details of construction; Fig. 2 is an enlarged sectional view of the impeller and motor assembly used in the washing apparatus of Fig. 1; and Fig. 3 is a view similar to Fig. 2 but illustrating an impeller and motor assembly of modified form.

Referring more particularly to Figs. 1 and 2, this invention has been shown as applied to dishwashing apparatus provided with a vat 1 mounted within a casing 2. The vat has an opening 3 at the front through which the dishes and utensils may be loaded into the open-work trays 4 and 5. The front opening has a door 6. Cleansing liquid, such as hot water, is supplied to the vat from a source of supply 7 from which a conduit 8 leads to a suitable spray device 9 located in the top of the vat. The supply of water is controlled by means of a valve 10. The vat is provided with a bottom wall 11 which has a centrally arranged sump 12 which drains toward a drain conduit 13, the drainage of liquid from the vat being controlled by means of a drain valve (not shown) which is controlled by a shaft 14 and a lever 15.

Located in the lower portion of the vat under the trays 4 and 5 is a suitable impeller 16 which is provided with a bell-like hub 17 upon which outwardly projecting liquid circulating blades 18 are mounted. The impeller 16 together with the blades 18 may be formed of any suitable material, such as a suitable phenol condensation product.

Located within the bell-like hub 17 is a suitable electric motor 19 which functions to drive the impeller. While any suitable electric motor may be used, a split-phase permanent capacitor type motor is used in the embodiment of the invention illustrated in the drawings. This motor comprises a stator 20 and a rotor 21, the rotor being attached to a shaft 22. The stator and rotor 20 and 21 are mounted within a housing comprising a cylindrical side wall 23 and upper and lower heads 24 and 25 rigidly secured to the side wall 23 in fluid-tight relation. These members may be and preferably will be secured together by bolts 25a, and suitable fluid-sealing washers 25b are interposed between the heads and the side wall. The upper head 24 is provided with a bearing 26 for the upper end of the shaft 22 and about this bearing there is provided an oil supplying packing gland 27. The lower head 25 is provided with a bearing 28 for the lower end of the shaft and at this lower end there is also provided an oil supplying gland 29. The upper head 24 also is provided with an upwardly projecting section 30 about the shaft, as shown, and a liquid sealing packing 31 is provided above this section, this packing being retained by a retainer 31a. The lower head 25 has a downwardly extending section 32 projecting through the bottom wall 11 of the vat, as shown, and upon which is threaded a nut 33 which tightly clamps this head to the bottom wall, and thereby functions to secure the motor as a whole to the vat.

Preferably and as shown, the bottom wall 11 of the vat will be provided with a central reentrant section 34 rising upwardly above the bottom of the sump 12, as clearly shown in Fig. 1, and which will be positioned horizontally in the vat, this section serving as the support for the motor. Interposed between the lower head 25 and the upper surface of the section 34 is a suitable sealing washer 35 which may be formed of any suitable sealing material, such as rubber. This seal prevents the leakage of water from the vat onto the floor.

The motor leads 36 enter the vat through the bottom wall section 34 in which an aperture 37 is provided for this purpose, and it also passes through an aperture 38 provided for it in the washer 35.

Attached to the upper end of the shaft 22 above the upper head 24 is a centrifugal slinger plate 39. This, as shown has the form of a frustum of a cone; and as shown, it is clamped between a shoulder 40 provided on the shaft 22 and a downwardly extending boss 41 provided on the inner wall of the hub 17.

The upper end 42 of the shaft 22 above the shoulder 40 is of reduced cross-section, and preferably it will be formed with a non-circular cross-section. This end of the shaft is received in an opening having a complementary shape and formed in the top of the hub 17 and the boss 41 depending from it, whereby a driving connection is effected between the shaft and the impeller. The impeller is held on to the shaft by means of a screw 43 threaded into the upper end of the shaft and which holds a washer 44 against the upper end of the hub, as shown.

It will be understood that the gasket 35 and the various packings about the shaft effectively prevent the admission of liquid to the motor housing. However, while the impeller is being rapidly rotated there is generally a great deal of spray in the vat, and this has a tendency at times to flow into the interior of the hub. The purpose of the centrifugal plate 39 is to eliminate such spray above the motor housing, at least that part of the housing where the shaft projects from it.

In the form of the invention shown in Fig. 3, a portion of the motor projects through the bottom wall of the vat. As shown, the impeller 45 is substantially the same construction as in the first form of the invention, the impeller being provided with a bell-shaped hub 46 and blades 47 projecting outwardly therefrom. The motor 48 here is provided with a housing 49 for the stator 50 and the rotor 51, which housing, as shown, has its side wall and upper head formed integrally. The stator and rotor together with the housing 49 project downwardly through an aperture 52 provided for them in the bottom wall 53 of the vat. This opening is sealed by means of a U-shaped rubber gasket 54 fitted into the opening in the manner shown and the motor housing is provided with an outwardly extending flange 55 resting on the upper leg of this gasket. The motor is secured by means of set screws 56 which are screwed through an outwardly projecting flange 57 located below the bottom wall 53 and which function to clamp a pressure plate 58 tightly against the lower leg of the gasket, as shown. Here also an oil supply packing 59 is provided for the lower end of the shaft, and a similar packing 60 for the upper end thereof. Also a liquid sealing packing 61 is provided for the upper end of the shaft. And here a slinger plate 62 is provided which has the same function as the plate 39 of the first form of the invention disclosed.

While I have shown and described particular embodiments of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. Dishwashing apparatus comprising a vat, a water circulating impeller in said vat, said impeller having a bell-like support and liquid circulating means mounted upon the exterior wall of said support, an electric motor mounted within said bell-like support, said motor having coacting stator and rotor elements, a housing enclosing said elements, and a shaft projecting from said housing and connected to said bell-like support to drive said impeller, and a centrifugal slinger plate attached to said shaft between said motor housing and said bell-like support.

2. A dishwashing apparatus comprising a vat, a water circulating impeller in the lower portion of said vat, said impeller having a bell-like support and liquid circulating means upon the exterior wall of said bell-like support, an electric motor located within said bell-like support, said motor having coacting stator and rotor elements, a housing enclosing said elements, and a shaft projecting from said housing driven by the rotor element and connected to the bell-like support to drive said impeller, liquid seal means for sealing the shaft where it emerges from said housing, and a plate above said seal means driven by said shaft and constructed and arranged to divert by centrifugal action water spray and condensation which tends to collect above said motor housing.

3. Dishwashing apparatus comprising a vat, a water circulating impeller in said vat, said impeller having a bell-like support and liquid circulating means mounted upon the exterior wall of said support, an electric motor mounted within said bell-like support, said motor having coacting stator and rotor elements, a housing enclosing said elements and a shaft projecting from said housing and connected to said bell-like support to drive said impeller, a centrifugal slinger plate attached to said shaft between said motor housing and said bell-like support, one wall of said housing having a section bearing on a wall of said vat, and a liquid sealing member interposed between said housing and vat wall.

4. Dishwashing apparatus, comprising a vat, a water circulating impeller in the lower portion of said vat, said impeller having a bell-like support and liquid circulating means upon the exterior wall of said bell-like support, an electric motor located within said bell-like support, said motor having coacting stator and rotor elements, a housing enclosing said motor elements, and a shaft projecting from said housing driven by the rotor element and connected to the bell-like support to drive said impeller, liquid sealing means for sealing the shaft where it emerges from said housing, a plate above said seal driven by said shaft and constructed and arranged to divert by centrifugal action water spray which tends to collect above said motor housing, said housing having a lower wall resting on the bottom wall of said vat, a bearing for the lower end of said shaft located in said lower wall of said housing, and liquid sealing means between said lower and bottom walls.

5. Dishwashing apparatus comprising an upright vat, a liquid circulating impeller in the lower portion of said vat having a hollow hub and liquid circulating blades projecting outwardly from said hub, an electric motor located within said hollow hub above the bottom wall of said vat, said motor having a housing and a shaft projecting from said housing, driving connection means between said motor and said hub, said housing having a downwardly extending section projecting through an opening provided for in the said bottom wall, and means attaching said section to said wall to secure said motor to said vat.

6. Dishwashing apparatus comprising a vat, a water circulating impeller in said vat, said impeller having a bell-like support and liquid circulating means mounted upon the exterior wall of said support, an electric motor mounted within said bell-like support, said motor having coacting stator and rotor elements, a housing enclosing said elements and a shaft projecting from said housing and connected to said bell-like support to drive said impeller, one wall of said housing having a section bearing on a wall of said vat, and means securing said section to said wall.

CARL S. DAYTON.

REFERENCES CITED

The following references are of record in the file of this patent:

UNITED STATES PATENTS

| Number    | Name   | Date           |
|-----------|--------|----------------|
| 1,927,943 | Long   | Sept. 26, 1933 |
| 2,212,872 | Barker | Aug. 27, 1940  |